United States Patent [19]
Balboni et al.

[11] Patent Number: 5,415,280
[45] Date of Patent: May 16, 1995

[54] DEVICE FOR TRANSFORMING A RANDOM SUCCESSION OF UNIT PACKETS INTO AN ORDERLY, REGULAR SUCCESSION THEREOF

[75] Inventors: Alessandro Balboni, Granarolo Emilia; Cristina Cumani, Bologna, both of Italy

[73] Assignee: SASIB S.p.A., Italy

[21] Appl. No.: 214,844

[22] Filed: Mar. 18, 1994

[30] Foreign Application Priority Data

Mar. 24, 1993 [IT] Italy .............................. GE93A0026

[51] Int. Cl.6 .............................................. B65G 47/68
[52] U.S. Cl. .................................. 198/435; 198/347.3
[58] Field of Search ..................... 198/347.1, 347.3, 435

[56] References Cited

U.S. PATENT DOCUMENTS

| | | | |
|---|---|---|---|
| 4,349,096 | 9/1982 | Thamerus | 198/347.3 |
| 4,890,718 | 1/1990 | Colamussi | 198/435 X |
| 5,009,303 | 4/1991 | Lutzke | 198/435 X |

FOREIGN PATENT DOCUMENTS

| | | | |
|---|---|---|---|
| 1169906 | 7/1985 | U.S.S.R. | 198/435 |
| 1369995 | 1/1988 | U.S.S.R. | 198/435 |

*Primary Examiner*—James R. Bidwell
*Attorney, Agent, or Firm*—Larson and Taylor

[57] ABSTRACT

A device for transforming a random succession of unit packets into an orderly, regular succession thereof includes a vertical collection/raising unit for supplying a stack of unit packets in a random succession to a horizontal conveyor/transfer unit. The conveyor/transfer unit transfers the stack of unit packets to a vertical discharge/lowering unit. The vertical discharge/lowering unit deposits the unit packets onto a conveyor which outputs the unit packets in an orderly, regular succession, the vertical discharge/lowering unit being actuated synchronously with the output conveyor.

17 Claims, 3 Drawing Sheets

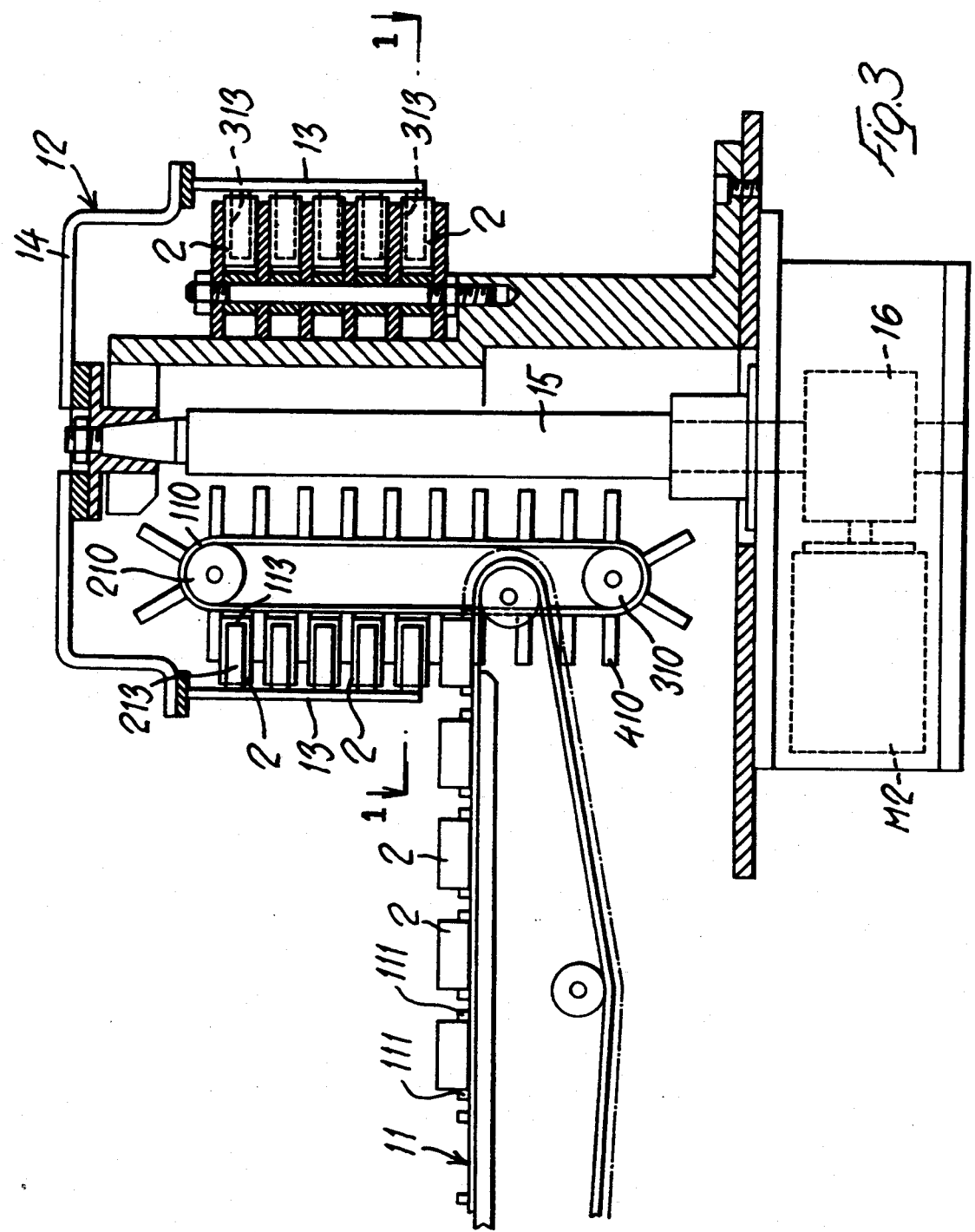

DEVICE FOR TRANSFORMING A RANDOM SUCCESSION OF UNIT PACKETS INTO AN ORDERLY, REGULAR SUCCESSION THEREOF

The invention relates to a device for transforming a random succession of unit packets into an orderly, regular succession thereof, and which in particular are also differently oriented. In particular the invention relates to a device of the aforementioned type which can also fulfil storage unit functions.

In the description and in the Claims, the term unit packets means products or sets of products which are already packaged or to be packaged.

The problem on which the invention is based consists in producing a device of the type initially described, which permits automatic, direct transfer of unit packets output in a random sequence by a production or packaging machine, to a further machine downstream, for implementation of a subsequent processing or packaging cycle, and which operates at a specific rate, pace or speed which is different from, or the same as that of the machine upstream, without giving rise to the need for stoppages of either machine, and safely guaranteeing continuous operation of the production cycle.

In the field of packaging of cigarettes, for example, the cigarette packets packaged in the packaging machine can be ejected by the latter onto endless belts on which the position of the individual packets is not defined. The packets often also need to be oriented differently.

The invention Solves the above-described problem, by means of a device of the type initially described, which comprises:

a vertical collection/raising unit which is disposed directly downstream of a conveyor for supplying unit packets in a random succession, and which forms a stack of unit packets;

a horizontal conveyor/transfer unit with several levels and with storage unit functions, which by means of angular movement transfers the stack of unit packets from the vertical collection/raising unit to a vertical discharge/lowering unit;

the said vertical discharge/lowering unit, which is disposed angularly spaced apart in the horizontal plane from the vertical collection/raising unit, and which deposits one after another the unit packets of a stack supplied to the latter by the conveyor/transfer unit, onto a conveyor which outputs the unit packets in an orderly, regular succession, the vertical discharge/lowering unit being actuated synchronously with the output conveyor.

The vertical discharge/lowering unit is actuated synchronously with the output conveyor, and to each step of the discharge/lowering unit for depositing a unit packet on the output conveyor, there corresponds synchronously a step of advance of the unit packets on the output conveyor, in order to accommodate a new unit packet thereon.

With reference to the field of packaging of cigarettes, the supply conveyor can consist of the conveyor itself for ejecting the packets packaged in the packaging machine, whereas the output conveyor for the device can consist of the supply unit of a further machine downstream.

The transfer conveyor must be synchronized with the output conveyor, and fulfils the double function of orienting the packets differently, and acting as a storage unit.

According to a further feature, the conveyor/transfer unit is supported such as to be movable along a closed annular path, corresponding to which, at angularly offset points, there are provided the vertical collection/raising unit and the vertical discharge/lowering unit, there being provided downstream of the vertical discharge/lowering unit at least one and preferably a plurality of storage stations which act as storage units, into which the conveyor/transfer unit transfers the stacks of unit packets in the event of stoppage of the output conveyor and thus of the vertical discharge/lowering unit.

In particular, the path of the conveyor/transfer unit is circular, about a vertical axis, and the vertical collection/raising unit and the vertical discharge/lowering unit are disposed angularly offset from one another by an angle of 90° relative to the said axis.

By using the above-described features, the starting and stopping times of the machine or machines upstream are made not dependent on the starting and stopping times of the machine or machines downstream, thus eliminating the need for oversized connecting belts, or for further devices acting as a storage unit. Additionally, there is a considerable saving in space, while at the same time a substantial number of storage stations is provided. During transfer, the unit packets are also rotated by 90° in the horizontal plane, such that by the time they reach the output their orientation has been altered correspondingly.

One or a plurality of storage units can also be provided in the inner angle area between the vertical collection/raising unit and the vertical discharge/lowering unit upstream thereof.

The conveyor/transfer unit is actuated in rotational steps at a pace which corresponds to that of the steps of the output conveyor divided by the number of unit packets in each stack on the transfer unit.

The above-described device thus permits direct, automatic connection of two different machines which operate at speeds and production rates which differ from one another without having to synchronize their operative steps. It also limits the mutual interference caused by stoppage of either of the machines, and in particular the machine downstream, which can adversely effect the efficiency of the production line.

The subject of the invention also comprises other features which further improve the above-described device, and which form the subject matter of the subclaims.

The particular features of the invention and the resulting advantages will be shown in greater detail in the description of a preferred embodiment, given by way of non-limiting example, and in the attached drawings, in which:

FIG. 3 is a view similar to FIG. 2, in which the vertical collection/raising unit and the associated supply conveyor have been omitted, whereas the actuating means of the horizontal conveyor/transfer unit with several levels, are illustrated.

Figure 1:
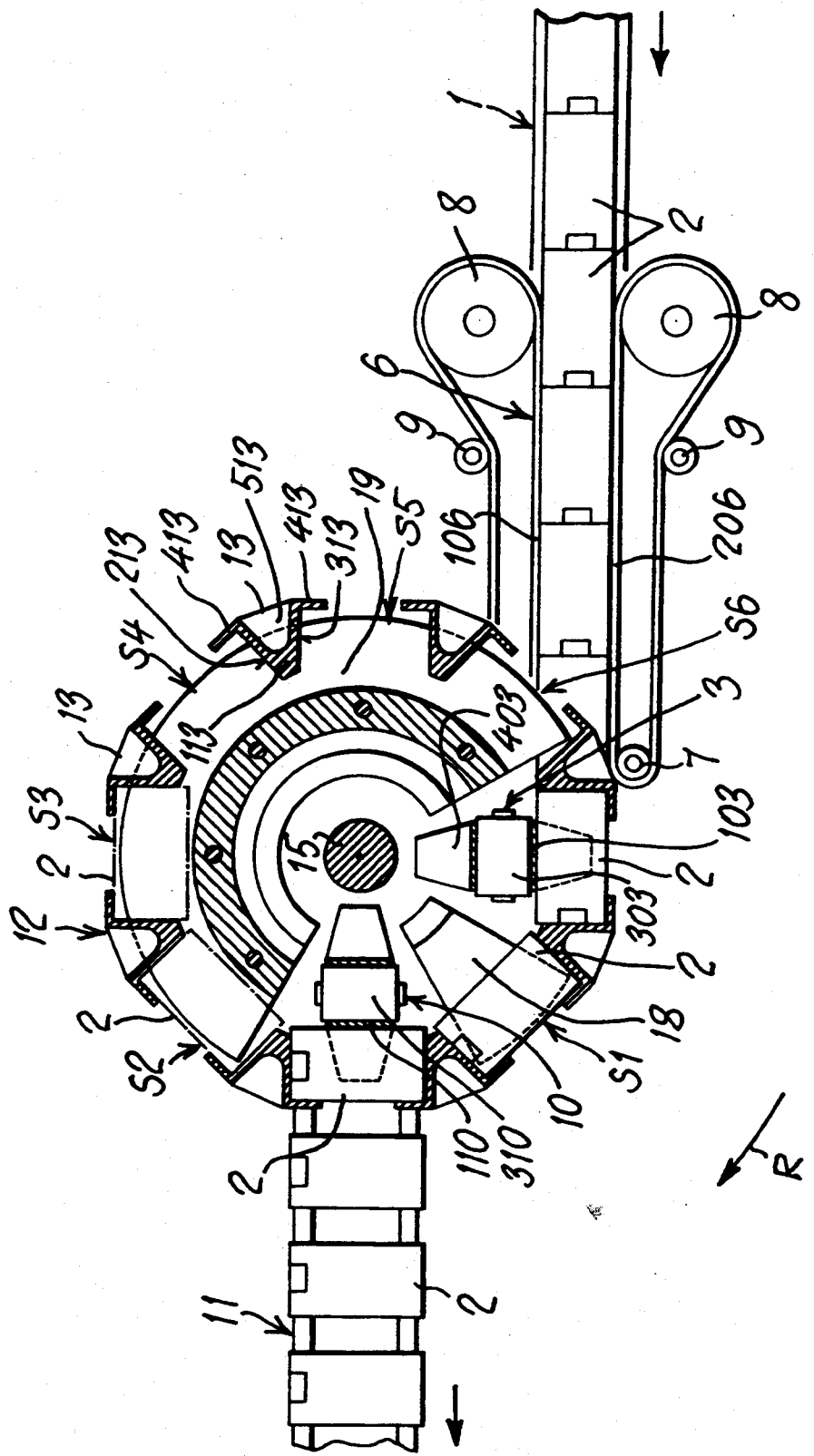
FIG. 1 is a horizontal cross-sectional view taken through the line 1—1 in FIGS. 2 and 3 of a device according to the invention, in particular for the transfer of cigarette packets.
Figure 2:
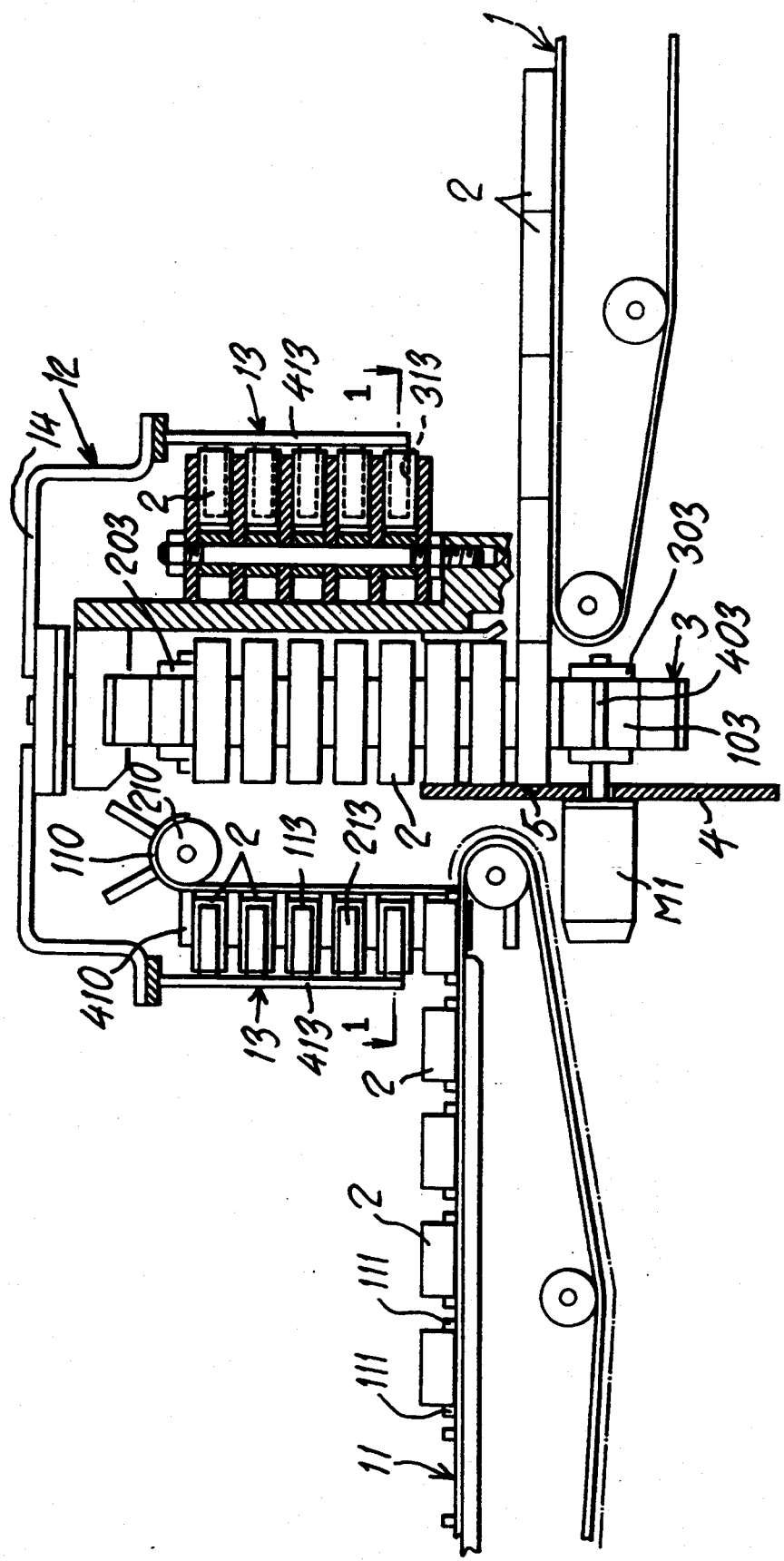
FIG. 2 is a lateral elevation, partly in central cross-section, of the device according to FIG. 1.

With reference to the Figures, a device according to the invention for transforming a random succession of unit packets into an orderly, regular succession thereof, comprises a conveyor 1 for supplying unit packets 2, in this case cigarette packets, in a random sequence. In the example illustrated, the supply conveyor 1 consists of an endless conveyor belt, of which only the end section is illustrated, and which can for example also be the conveyor for ejecting packets 2 of cigarettes from a packaging machine or the like. As shown in particular in FIGS. 1 and 2, the supply conveyor 1 ends at a vertical collection/raising unit 3, which consists of an endless vertical blade-type conveyor 103, which is driven about return rollers 203, 303, of which at least one is driven, for example by a step motor M1. The blades 403 of the conveyor 103 are equidistant from one another, such as to enable a packet 2 to be accommodated between each pair of adjacent blades 403, and the steps of the motor M1 are such as to always bring a blade into a position co-planar with the belt of the supply conveyor 1. The packets 2 are positioned correctly relative to the vertical collection/raising unit 3 by a vertical stop which is provided on the downstream side, relative to the direction of supply of the packets 2. The drive steps of the motor M1 are controlled by a correct positioning sensor 5, which is attached, in horizontal alignment with the incoming packets 2, on the side facing the packets 2 of the vertical stop 4. Associated with the end section of the supply conveyor 1, directly upstream of the vertical collection/raising unit 3, are means for regulating the supply flow of the packets 2. In this case, these means consist of a slowing channel 6, which gives rise to the formation of a row of packets 2, which are in reciprocal contact with one another, longitudinal end to longitudinal end. The bottom of the slowing channel 6 consists of the supply conveyor 1 itself, whereas the lateral walls each consist of an endless vertical belt 106, 206, which is actuated so as to run at a speed other than that of the supply 1, the two vertical lateral belts 106, 206, having two directions of running which are opposite to one another. The vertical lateral belts 106, 206 travel around return rollers 7, 8, at least one of which is motorized, and are rendered taut by means of an external tensioning roller 9.

In a position angularly spaced apart by 90°, i.e. with orientation offset by 90° in the horizontal plane from the vertical collection/raising unit 3, there is provided a vertical discharge/lowering unit 10, which has a structure similar to that of the vertical collection/raising unit 3, since it consists of an endless vertical blade-type belt 110, which travels about rollers 210, 310, at least one of which is motorized, for example by means of a step motor or the like (not shown in detail). The blades 410 of the vertical discharge/lowering unit 10 are disposed equidistantly from one another, corresponding to the blades of the vertical collection/raising unit 3, whereas the blade-type belt 110 is actuated so as to run in a descending direction, opposite to that of the belt 103 of the collection/raising unit 3. Each step travelled by the blade-type belt 110 always brings the blades 410 into a position which is co-planar with the corresponding blades 403 of the belt 103 of the collection/raising unit 3. At the same level as the supply conveyor belt 1, in the position of the vertical discharge/lowering unit 10, there is an output conveyor 11, which for example consists of a double, blade-type belt, a space for a packet 2 being provided between each pair of successive blades 111. The output conveyor 11 can consist of the supply line of a machine for further processing of the packets 2, for example a cellophane-wrapping machine or the like, and is actuated in steps which correspond to the operative steps of the machine downstream. The vertical discharge/lowering unit 10 is actuated synchronously with the operating steps of the output conveyor, such that for each lowering step corresponding to the latter, a free space is supplied for discharging the lowest packet 2 from the discharge/lowering unit 10 onto the output conveyor 11.

A stack of packets 2 is formed in the vertical collection/raising unit 3, and is transferred to the vertical discharge/lowering unit 10 by means of a horizontal conveyor/transport unit 12 with several levels, in an angular movement co-axial with the vertical axis of offsetting between the collection unit 3 and the discharge unit 10. According to an advantageous improvement, the horizontal conveyor/transfer unit 12 with several levels also acts as a storage unit. In this case, the stack of packets 2 is transferred from the collection unit 3 to the discharge unit 10 by means of two rotational steps of 45° each, an intermediate storage station S1 being provided in the inner angle area thereinbetween. The frequency of the transfer steps of the conveyor/transfer unit 12 is controlled such that it corresponds to the number of steps per time unit of the output conveyor 11, i.e. of the discharge/lowering unit 10, divided by the number of packets 2 in each stack of packets.

According to a further improvement, one or a plurality of storage stations S2 to S6 can also be provided in the outer angle area between the discharge unit 10 and the collection unit 3. These stations are used mainly in order to avoid having to stop the machine or machines upstream when, for reasons of incorrect operation or service procedures, the machine or machines downstream has or have to be stopped temporarily. In this case, the output conveyor 11 and the discharge/lowering unit 10 are also stopped, whereas by maintaining the horizontal conveyor/transfer unit 12 in motion, the stacks of packets 2 which gradually form in the collection/raising unit 3 are transferred beyond the discharge/lowering unit 10, into the said outer storage stations S2 to S6, which are thus filled in succession.

According to the preferred embodiment illustrated, the horizontal conveyor/transfer unit 12 consists of a plurality of vertical rack-type entrainers 13 which are distributed equidistantly from one another along the circular path co-axial to the vertical axis of rotation of the conveyor/transfer unit 12. The rack-type entrainers 13 are supported by an upper rotary head 14 which is attached integrally so as to rotate co-axially to the upper end of a drive shaft 15. The shaft 15 is actuated in rotational steps by a motor M2 by means of pacer 16, for example by a so-called jogging unit or the like. The actuating unit M2 16, is actuated synchronously with the actuation of the output conveyor 11 and of the discharge unit 10, by means not illustrated which can be of any type, for example mechanical, electronic, electromechanical or the like. The entrainment teeth 113 of the vertical rack-type entrainers 13 project radially from the outside towards the inside into the gaps between the blades 403, 410 of the collection/raising unit 3 and of the discharge/lowering unit 10. The entrainment teeth 113 co-operate at least with the head and base ends of the packets 2, with reference to the direction of rotation (arrow R) of the conveyor/transfer unit 12.

The storage stations S1 in the area of the inner angle between the collection/raising unit 3 and the discharge/lowering unit 10, and S2 to S6 in the area of the outer angle thereinbetween, consist of a plurality of co-axial disc sectors 18, 19 which are disposed such as to overlap one another horizontally and vertically. The sectors are equidistant to correspond to the blades 403, 410 of the collection/raising unit 3 and of the discharge/lowering unit 10, and extend co-planar to the said blades 403, 410, thus forming a continuous angular extension on the arc of the outer angle and of the inner angle between the collection/raising unit 3 and the discharge/lowering unit 10.

The number of vertical rack-type entrainers 13 and the geometry of the device are defined both by the radius of the angular path of the conveyor/transfer unit 12, and by the dimensions of the packets 2, taking into account the need tom arch the production speed of the two machines upstream and downstream of the device itself.

In the example illustrated, the conveyor/transfer unit 12 has eight vertical rack-type entrainers 13 which are angularly spaced apart from one another by 45°. Each vertical rack-type entrainer 13 has entrainment teeth 113 with a V-shaped transverse cross-section, each leg 213, 313 of the V pressing against the associated opposing head end and base end of two successive packets 2. The angle of opening of the V, corresponds to the pre-selected geometry. In addition, at the radially outer end, each entrainment tooth 113, and in particular each leg of the V, bears a circumferential tongue 413 which presses against the outer side of the associated packet 2. In the example illustrated, this tongue 413 consists of a continuous vertical rib which connects the individual entrainment teeth 113 to one another. In order to reduce the movement inertia of the conveyor/transfer unit 12, each vertical rack-type entrainer 13 is provided with an outer vertical weight-reducing recess 513.

As shown by the Figures, the device according to the invention simultaneously also enables a specific orientation of the packets on the output conveyor 11 to be obtained, relative to that of the supply conveyor 1. In this particular case, the packets 2 are rotated 90° in the horizontal plane. A different orientation can be obtained by providing a different angle between the collection/raising unit 3 and the discharge/lowering unit 10.

We claim:

1. Device for transforming a random succession of unit packets into an orderly, regular succession thereof, comprising:
   means for regulating the speed of flow of unit packets comprising a slowing channel having a bottom and vertical lateral walls, the bottom of the slowing channel comprising a supply conveyer having an endless conveyor belt and the vertical lateral walls of the slowing channel comprising two endless slowing belts actuated to run in directions opposite one another;
   a vertical collection/raising unit disposed directly downstream of the supply conveyor for supplying unit packets in a random succession, and forming a stack of the unit packets;
   a horizontal conveyor/transfer unit having several levels and storage unit functions, for transferring the stack of unit packets from the vertical collection/raising unit to a vertical discharge/lowering unit by means of angular movement, said vertical discharge/lowering unit being angularly spaced apart in a horizontal plane from the vertical collection/raising unit for depositing one after another the unit packets onto an outer conveyor which outputs the unit packets in an orderly, regular succession, the vertical discharge/lowering unit being actuated synchronously with the output conveyor.

2. Device according to claim 1, wherein the vertical collection/raising unit and the vertical discharge/lowering unit are disposed at points angularly offset to one another along a closed annular path of the conveyor/transfer unit.

3. Device according to claim 2, wherein the closed annular path of the conveyor/transfer unit is a circular path about a vertical axis, and the collection/raising unit and the discharge/lowering unit are offset by 90° from one another.

4. Device according to claim 1, wherein the discharge/lowering unit is actuated synchronously with the output conveyor in order to accommodate a new unit packet.

5. Device according to claim 2, further comprising at least one intermediate storage station for a stack of unit packets located along the closed annular path of the conveyor/transfer unit downstream of the discharge/lowering unit or in the area of the angle between the vertical collection/raising unit and the vertical discharge/lowering unit upstream thereof, the horizontal conveyor/transfer unit being actuated in rotational steps at a pace corresponding to the steps of the output conveyor divided by the number of unit packets in each stack on the transfer unit.

6. Device according to claim 1, wherein the vertical collection/raising unit is controlled in steps by a correct positioning sensor for each unit packet which reaches the collection/raising unit.

7. Device according to claim 1, further comprising control means for de-activating the vertical discharge/lowering unit if the output conveyor is stopped, and for enabling the horizontal conveyor/transfer unit to transfer the stacks of unit packets in succession beyond the discharge/lowering unit, to further storage stations.

8. Device according to claim 1, wherein the collection/raising unit and the discharge/lowering unit each comprise an endless vertical conveyor belt having blades distributed vertically equidistant from one another at a distance of at least the vertical dimensions occupied by the individual unit packets, the endless vertical conveyor belts being driven about rollers which are vertically aligned with one another, at least one of said rollers being actuated by a motor.

9. Device according to claim 8, wherein the conveyor/transfer unit includes a plurality of stationary disc sectors positioned vertically above one another, at least in an outer angle between the collection/raising unit and the discharge/lowering unit downstream thereof, and positioned vertically equidistant from one another corresponding to the distance between the blades of the vertical conveyor belts of the collection/raising unit and of the discharge/lowering unit, the disc sectors being co-axial to an axis of rotation of the conveyor/transfer unit and co-planar to the blades in the stages of stoppage of the discharge/lowering unit and of the collection/raising unit between individual operative steps.

10. Device according to claim 9, wherein the stationary disc sectors are positioned between the discharge/lowering unit and the collection/raising unit and in an inner angle area between the discharge/lowering unit and the collection/raising unit, upstream of the discharge/lowering unit.

11. Device according to claim 8 wherein the conveyor/transfer unit comprises a plurality of outer vertical rack-type entrainers having drive teeth of extending radially from the outside towards the inside in the vertical spaces between the disc sectors and the blades, the vertical rack-type entrainers being distributed equidistantly from one another peripherally and co-axially to the disc sectors and supported to rotate in steps and integrally with one another and co-axially to the disc sectors.

12. Device according to claim 11, wherein each entrainment tooth includes a circumferential retention tongue which co-operates with an outer side of a corresponding unit packet.

13. Device according to claim 11, wherein the unit packets comprise boxes having a parallelepiped rectangular form and the vertical rack-type entrainers include a V-shaped transverse cross-section orientated with the vertex radially towards the axis of rotation, the legs of said V-shaped transverse cross-section cooperating with respective opposing longitudinal ends of two successive packets.

14. Device according to claim 13, wherein each leg of each entrainment tooth includes, on its radially outer free end, a continuous, circumferential vertical tongue for co-operating with the outer side of the corresponding packet of two successive packets, and for connecting the entrainment teeth to one another.

15. Device according to claim 1, further comprising an upper rotary head for supporting the vertical rack-type entrainers, the upper rotary head being supported to rotate integrally on a vertical shaft actuated in rotational steps by one of a step motor or a continuous operation motor, synchronously with the steps of the discharge/lowering unit and the steps of the output conveyor.

16. Device according to claim 1, wherein the output conveyor comprises a double, blade-type belt.

17. Device according to claim 8, further comprising a stop for supporting a sensor for correct positioning for collection of each unit packet supplied, and for actuating the step of displacement of the blade-type belt of the collection/raising unit on a side of the vertical collection/raising unit opposite the side of supply of the unit packets.

* * * * *